(12) United States Patent
Malecki

(10) Patent No.: US 8,826,189 B2
(45) Date of Patent: Sep. 2, 2014

(54) APPARATUS HAVING A CONTROL UNIT THAT RECOGNIZES CIRCLE MOTIONS TO CHANGE A DISPLAY STATE OF AN IMAGE

(75) Inventor: Mikolaj Michal Malecki, Poniatowa (PL)

(73) Assignee: Samsung Electronics Co., Ltd., Suwon-si (KR)

(*) Notice: Subject to any disclaimer, the term of this patent is extended or adjusted under 35 U.S.C. 154(b) by 271 days.

(21) Appl. No.: 13/044,602

(22) Filed: Mar. 10, 2011

(65) Prior Publication Data

US 2012/0038676 A1 Feb. 16, 2012

(30) Foreign Application Priority Data

Aug. 12, 2010 (KR) .............. 2010-0077868

(51) Int. Cl.
*G06F 3/033* (2013.01)
*G06F 3/048* (2013.01)
*G09G 5/00* (2006.01)

(52) U.S. Cl.
USPC ............ 715/863; 715/800; 345/660; 345/661

(58) Field of Classification Search
CPC ............................................. G06F 2203/04806
USPC ................... 715/863, 800, 252; 345/660–663
See application file for complete search history.

(56) References Cited

U.S. PATENT DOCUMENTS

| | | | |
|---|---|---|---|
| 7,456,849 B2* | 11/2008 | Brooke | 345/661 |
| 8,159,465 B2* | 4/2012 | Stallings | 345/173 |
| 8,339,376 B2* | 12/2012 | Stallings | 345/173 |
| 2006/0232611 A1* | 10/2006 | Brooke | 345/671 |
| 2008/0165133 A1* | 7/2008 | Blumenberg et al. | 345/173 |
| 2008/0211783 A1* | 9/2008 | Hotelling et al. | 345/173 |
| 2009/0100383 A1* | 4/2009 | Sunday et al. | 715/863 |
| 2009/0265670 A1* | 10/2009 | Kim et al. | 715/863 |
| 2009/0300554 A1* | 12/2009 | Kallinen | 715/863 |
| 2010/0156806 A1* | 6/2010 | Stallings | 345/173 |
| 2010/0229130 A1* | 9/2010 | Edge et al. | 715/863 |
| 2010/0283742 A1* | 11/2010 | Lam | 345/173 |
| 2010/0315438 A1* | 12/2010 | Horodezky et al. | 345/661 |
| 2011/0029917 A1* | 2/2011 | Um | 715/800 |

* cited by examiner

*Primary Examiner* — Tadeese Hailu
*Assistant Examiner* — Asteway T Gattew
(74) *Attorney, Agent, or Firm* — Sughrue Mion, PLLC

(57) ABSTRACT

A display method for controlling a display state of an image regardless of a motion direction, includes displaying an image in a screen; and when an inward or outward motion having a center, is input onto the screen, the motion moving in a direction toward or away from the center, controlling a display state of the image according to the direction of the motion.

1 Claim, 11 Drawing Sheets

APPARATUS HAVING A CONTROL UNIT THAT RECOGNIZES CIRCLE MOTIONS TO CHANGE A DISPLAY STATE OF AN IMAGE

CROSS-REFERENCE TO RELATED APPLICATIONS

This application claims priority from Korean Patent Application No. 2010-0077868 filed on Aug. 12, 2010 in the Korean Intellectual Property Office, the disclosure of which is incorporated in its entirety herein by reference.

BACKGROUND

1. Field

Exemplary embodiments relate generally to a method and an apparatus for displaying. More particularly, the exemplary embodiments relate to a display method and a display apparatus for adjusting a display state of an image according to a motion input on a screen.

2. Description of the Related Art

One of methods for performing a zoom function in a touch screen includes a user tapping on the touch screen twice to execute the zoom-in function and keeping the touch on the touch screen to execute the zoom-out function. The zoom function in a multi-touch interface is carried out by moving a finger along the touch screen or by using a particular button added to the screen or a widget. Conventional arts describe the zoom function control based on a touch motion with two fingers or based on an icon.

Devices using the touch screen may provide an interface, such as a wheel-type interface, with the motion input on the screen as shown in FIG. 1, to perform the zoom function using the motion input on the screen or the wheel interface. According to the rolling direction of the wheel-type motion drawn on the screen, the zoom-in function or the zoom-out function is selected.

However, since the conventional methods are limited by the screen size, a user experiences inconvenience when a button is added to the screen. As such, it is not always feasible to execute the zoom function using the additional button. The zoom function using the additional widget requires adding the widget and accordingly requires additional steps to enter the zoom function mode.

Thus, for the zoom function in the multi-touch screen, it is necessary to reduce or enlarge the image to a scale limited by the screen size for a single step because the screen size is limited. For example, as shown in FIG. 1, the zoom-out function requires a motion input, the scale of which is limited to a particular length a, and the zoom-in function requires a motion input, the scale of which is limited to a particular length b. The problem is that the finger size and the capability of one finger of a particular person may be unsuitable for such zoom functions.

In the zoom function using the wheel-type motion, disadvantageously, the selection of the zoom-in function or the zoom-out function is determined by a rolling direction of the wheel-type motion. For example, when the counterclockwise wheel-type motion is input, the zoom-out function is selected. When the clockwise wheel-type motion is input, the zoom-in function is input as shown in FIG. 1. Namely, the clockwise motion executes the zoom-in function to enlarge the image, and the counterclockwise motion executes the zoom-out function to reduce the image. Alternatively, the counterclockwise motion may select the zoom-in function and the clockwise motion may select the zoom-out function to reduce the image.

In this regard, to execute the zoom-in or zoom-out function, users need to remember the clockwise or counterclockwise rolling direction of the motion.

SUMMARY

Exemplary embodiments have been provided to address the above-mentioned and other problems and disadvantages occurring in the conventional arrangement, and an aspect of an exemplary embodiment provides a display method and a display apparatus for adjusting a display state such as zoom function, without limitation of a screen size.

An aspect of an exemplary embodiment provides a display method and a display apparatus for adjusting a display state such as zoom function, regardless of a rolling direction of a motion.

An aspect of another exemplary embodiment, a display method includes displaying an image in a screen; and when an inward or outward motion is input onto the screen, controlling a display state of the image according to a direction of the motion.

The controlling of the display state may zoom out when the motion proceeds inward, and zoom in when the motion proceeds outward.

The controlling of the display state may decrease at least one of a brightness, a contrast, and a resolution of the image when the motion proceeds inward, and increase at least one of the brightness, the contrast, and the resolution of the image when the motion proceeds outward.

The motion may be an inward or outward screw-like motion.

The controlling of the display state may include when the motion is input in a preset length, displaying a first expected, or predetermined, inward motion course and a second expected, or predetermined, outward motion course.

When the motion proceeds inward or outward, stops the progress, and alters the direction, the controlling of the display state may control the display state of the image conversely.

The controlling of the display state may zoom in when the motion proceeds inward, and zoom out when the motion proceeds outward.

The image may include at least one of a web browser image, a photo browser image, and a PDF browser image.

The screen may be a display driven by a touch screen or a mouse.

An aspect of another exemplary embodiment provides a display apparatus including an output unit for displaying an image in a screen; a motion input unit for receiving an inward or outward motion on the screen; and a control unit for controlling the output unit to regulate a display state of the image according to a direction of the motion input to the motion input unit.

The control unit may zoom out when the motion proceeds inward, and zoom in when the motion proceeds outward.

The control unit may decrease at least one of a brightness, a contrast, and a resolution of the image when the motion proceeds inward, and increase at least one of the brightness, the contrast, and the resolution of the image when the motion proceeds outward.

The motion may be an inward or outward screw-like motion.

The motion may include a plurality of circular motions input in succession within a certain time. When a diameter of the circular motions gradually increases, the control unit may recognize as the outward motion. When the diameter of the circular motions gradually decreases, the control unit may recognize as the inward motion.

When the motion is input in a preset length, the control unit may display a first expected inward motion course and a second expected outward motion course.

When the motion proceeds inward or outward, stops the progress, and alters the direction, the control unit may control the display state of the image conversely.

The control unit may zoom in when the motion proceeds inward, and zoom out when the motion proceeds outward.

The image may include at least one of a web browser image, a photo browser image, and a PDF browser image.

The screen may be a display driven by a touch screen or a mouse.

An aspect of another exemplary embodiment provides A display method including: displaying an image on a screen; and inputting a motion comprising a radius of curvature; controlling a display state of the image based on whether the radius of curvature of the motion increases or decreases.

BRIEF DESCRIPTION OF THE DRAWING FIGURES

These and/or other aspects and advantages of the present general inventive concept will become apparent and more readily appreciated from the following description of the embodiments, taken in conjunction with the accompanying drawings of which:

DETAILED DESCRIPTION OF THE EXEMPLARY EMBODIMENTS

Figure 1:
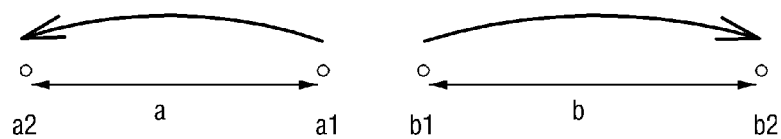
FIG. 1 illustrates a general zoom function in a display.

Reference will now be made in detail to the exemplary embodiments, examples of which are illustrated in the accompanying drawings, wherein like reference numerals refer to the like elements throughout. Expressions such as "at least one of," when preceding a list of elements, modify the entire list and not the individual elements of the list.

Figure 2:
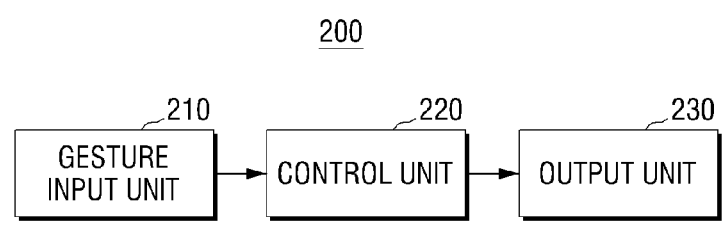
FIG. 2 is a simplified block diagram of a display apparatus according to an exemplary embodiment.

FIG. 2 is a simplified block diagram of a display apparatus according to an exemplary embodiment. As shown in FIG. 2, the display apparatus 200 includes a motion input unit 210, a control unit 220, and an output unit 230.

The motion input unit 210 receives an inward or outward motion, or gesture, on a screen.

Herein, the motion input unit 210 can be a touch pad or a touch screen which receives a motion, such as a drag motion, when a user touches a spot on the touch screen, and sends the received information to the control unit 220. The motion input unit 210 can be a mouse which receives a motion, e.g., a drag motion, when the user moves a mouse cursor displayed on the screen, and sends the received information to the control unit 220.

In an exemplary embodiment, the motion can be an inward or outward screw-like motion, e.g., a helical motion.

Figure 3A:
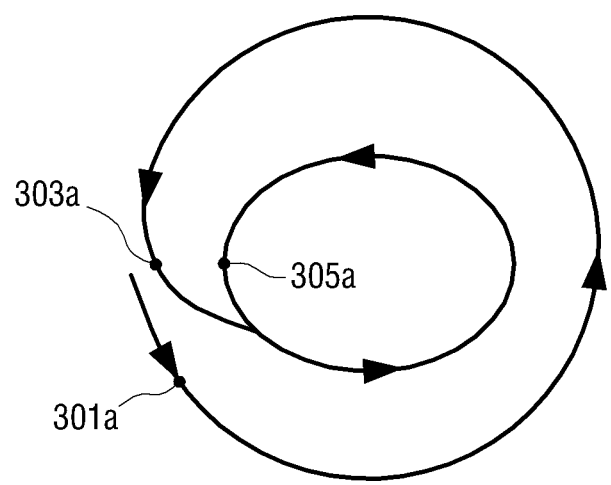
FIGS. 3A and 3B illustrate motions according to an exemplary embodiment.
Figure 3B:
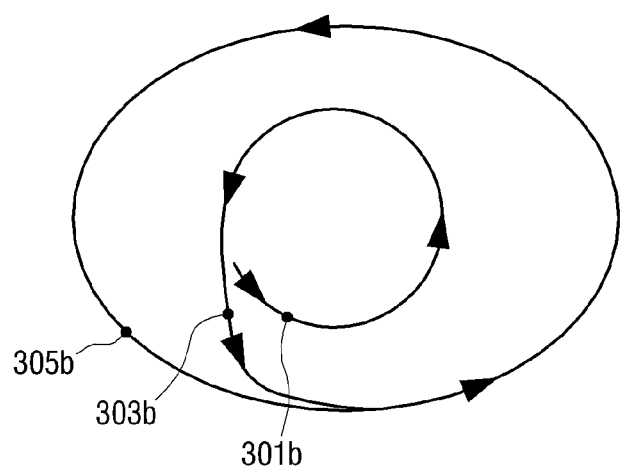
Figure 4A:
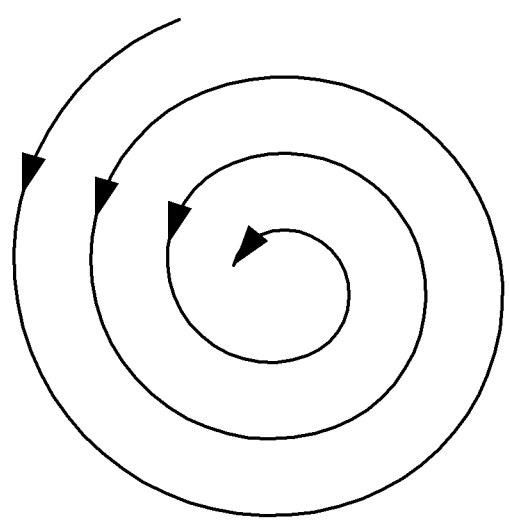
FIGS. 4A and 4B illustrate motions according to another exemplary embodiment.
Figure 4B:
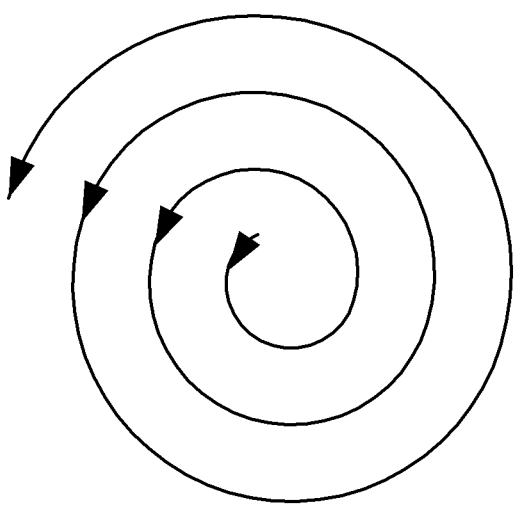

For example, for the inward motion as shown in FIG. 3A, a first circular motion of a certain size, e.g., a large circular motion, is input first and a second circular motion, e.g., a small circular motion, is input inside the large circular motion in succession. For the outward motion as shown in FIG. 3B, the first circular motion of a certain size, e.g., a small circular motion, is input first and the second circular motion, e.g., a large circular motion, is input outside the small circular motion in succession. The inward motion can be the screw-like motion input helically toward the center as shown in FIG. 4A, and the outward motion can be the screw-like motion input helically and outwardly from the center as shown in FIG. 4B. The screw-like motion may be one continuous fluid movement.

Alternatively, the inward or outward motion can be a plurality of separate circular motions input in sequence within a certain time.

Figure 5A:
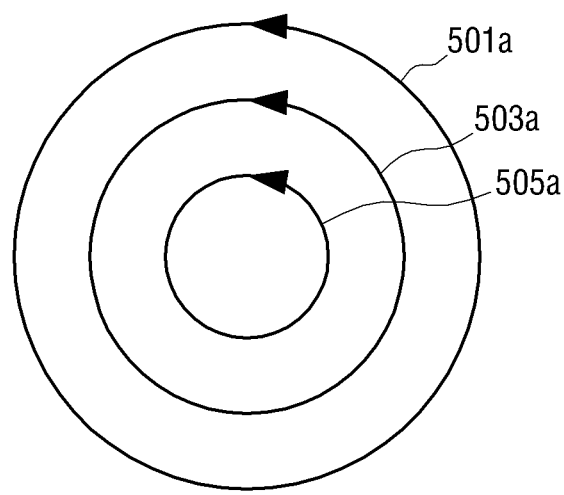
FIGS. 5A and 5B illustrate motions according to yet another exemplary embodiment.

For example, for the inward motion, the first circular motion of a certain size, e.g., a large circular motion 501a, from the plurality of circular motions, is input and thereafter the remaining circular motions 503a, 505a among the plurality of circular motions are input in sequence according to a decreasing size of the motion as shown in FIG. 5A. That is, for the inward motion, the plurality of circular motions 501, 503a, 505a are sequentially made based on a decreasing size or diameter of the motions, i.e., each circular motion is made with a smaller size than the subsequent motion.

Figure 5B:
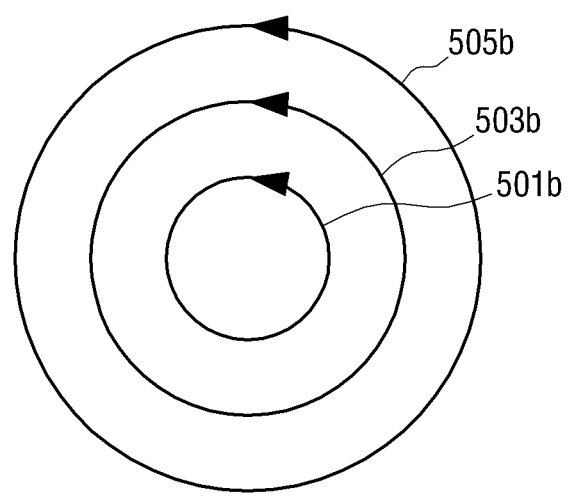

For the outward motion, the first circular motion of a certain size, i.e., a small circular motion 501b, from among the plurality of circular motions, is input and thereafter the remaining circular motions 503b, 505b among the plurality of circular motions, are input in sequence according to an increasing size of the motion as shown in FIG. 5B. That is, for the outward motion, the plurality of circular motions 501b, 503b, 505b are sequentially made based on an increasing size or diameter of the motions, i.e., each circular motion is made with a larger size than the prior motion.

In this exemplary embodiment, to execute the zoom-in function or the zoom-out function, it is not necessary to input the motion in a predefined rotation direction such as clockwise or counterclockwise. While the counterclockwise direction of the motion is shown in FIGS. 3A, 3B, 4A, 4B, 5A and 5B, the motion is not limited to the counterclockwise direction. The motion can be made clockwise.

Referring back to FIG. 2, according to the direction of the motion input to the motion input unit 210 relative to the center of the motion, the control unit 220 controls the output unit 230 to regulate a display state of an image.

In this exemplary embodiment, when the motion proceeds inward, the control unit 220 zooms out the image, and when the motion proceeds outward, the control unit 220 zooms in the image. Alternatively, when the motion proceeds inward, the control unit 220 may zoom in the image, and when the motion proceeds outward, the control unit 220 may zoom out the image.

For example, the control unit 220 can reduce or enlarge the image an amount which is based on the relative size difference between two successive circular motions as shown in FIGS. 3A and 3B.

The control unit of the display apparatus according to an exemplary embodiment executes the zoom-in or zoom-out function according to the inward or outward progression of the motion, rather than the rolling direction of the input motion. Thus, a user can easily execute the zoom-in or zoom-out function without having to remember the rolling direction of the motion.

Alternatively, when the motion progresses inward, the control unit 220 decreases at least one of a brightness, a contrast, and a resolution of the image. When the motion progresses outward, the control unit 220 increases at least one of the brightness, the contrast, and the resolution of the image.

That is, the control unit of the display apparatus according to an exemplary embodiment can not only zoom in or zoom out, but also control the display state of the image such as brightness, contrast, and resolution of the image, according to the inward or outward motion.

In one exemplary embodiment, when the motion is input for a preset length, the control unit 220 displays a first expected inward motion course and a second expected outward motion course.

Figure 6:
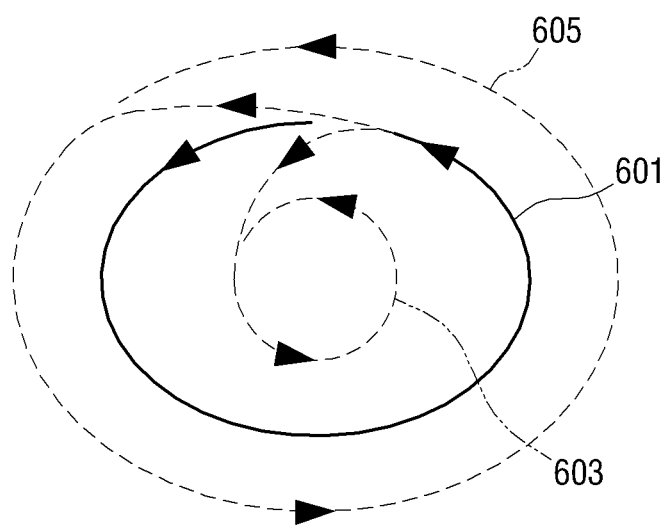
FIG. 6 illustrates a method for displaying an expected course of the motion according to an exemplary embodiment.

For example, when recognizing the input of the motion 601 of a certain length, the control unit can display the first expected motion course 603 proceeding inward and the second expected motion course 605 proceeding outward as shown in FIG. 6.

Referring back to FIGS. 3A and 3B, when the inward or outward gesture stops or alters its direction relative to the center of motion, the control unit 220 controls the display state of the image to switch from the zoom-in function to the zoom-out function.

In the exemplary embodiment of FIG. 3A, when the motion proceeds inward from the location 301a to the location 303a and clockwise at the location 305a, the zoom direction can be changed from the zoom-out function to the zoom-in function. As shown in FIG. 3B, when the motion proceeds outward from the location 301b to the location 303b and clockwise at the location 305b, the zoom direction can be changed from the zoom-in function to the zoom-out function.

Accordingly, when the inward or outward motion input is recognized and the motion input first begins to proceed in a direction relative to the center of the motion which is opposite from the direction of the first motion, the control unit can control the display state of the image to switch between the zoom-in function and the zoom-out function. That is, if the control unit is performing the zoom-in function, it will switch the zoom-out function, and if the control unit is performing the zoom-out function, it will switch the zoom-in function.

When recognizing the inward or outward motion input, the control unit of the display apparatus according to an exemplary embodiment can recognize the continuous input of the motion until recognizing the discontinuance of the motion input, for example, until the user's finger is detached from, i.e., no longer touching, the touch screen.

Figure 7:
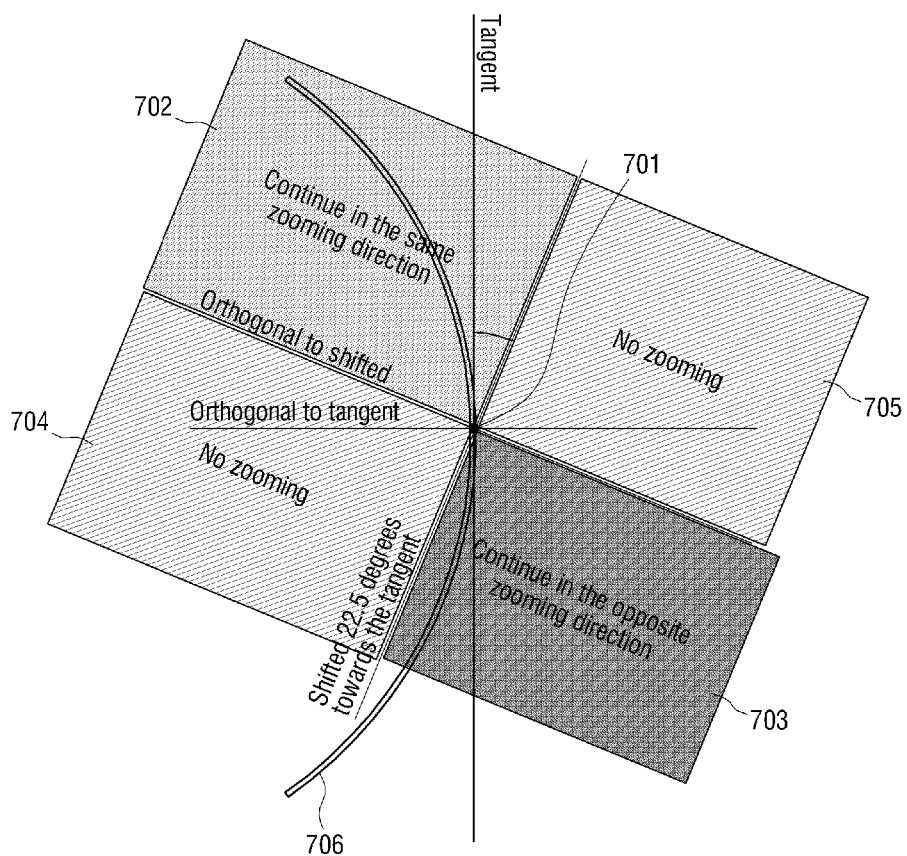
FIG. 7 illustrates a method for recognizing the motion when a direction of the motion is maintained or changed according to an exemplary embodiment.

FIG. 7 illustrates a method for recognizing the motion when the direction of the motion is maintained or changed according to an exemplary embodiment. In FIG. 7, the instantaneous motion of the input is in a general upward direction of FIG. 7.

For instance, when the zoom-in or zoom-out function is selected in the inward direction 303a or the outward direction 303b during the counterclockwise motion as shown in FIGS. 3A and 3B, given the current motion location 701 in FIG. 7, four regions 702 through 705 are defined around the current location. The four regions 702 through 705 can be divided based on a first line extending through the current location 702 and shifted by a certain angle from the tangent of the motion 706 at the current location 701, and a second line orthogonal to the first line. Herein, the motion toward the region 702 can be recognized as the motion of the same direction as the first motion, and the motion toward the region 703 can be recognized as the motion in the opposite direction from the first motion. The motions toward the region 704 and the region 705 are not recognized as the zoom function motions.

Referring back to FIG. 2, the output unit 230 displays the image in the screen. More specifically, the output unit 230 displays the image with the display state controlled by the control unit 220 through the zoom-in or zoom-out function which enlarges or reduces the image, or through the function which increases or decreases the brightness, the contrast, and the resolution of the image.

Herein, the image can include various images such as web browser image, photo browser image, and PDF browser image. The image is not limited to those examples, and can include other images.

The screen on which the output unit 230 displays the image can be driven by a touch screen or a mouse.

The output unit 230 can employ various display devices such as Liquid Crystal Display (LCD), Plasma Display Panel (PDP), monochrome display, Color Graphics Adaptor (CGA) display, Enhanced Graphics Adaptor (EGA) display, Variable Graphics Adaptor (VGA) display, super VGA display, and Cathode Ray Tube (CRT).

In general, the output unit 230 not only displays the image on the screen but also displays a Graphic User Interface (GUI) providing the easy interface between the display user and an operating system (OS) or an application executed in the OS. Mostly, the GUI represents programs, files, and operation options as graphical images.

Figure 8:
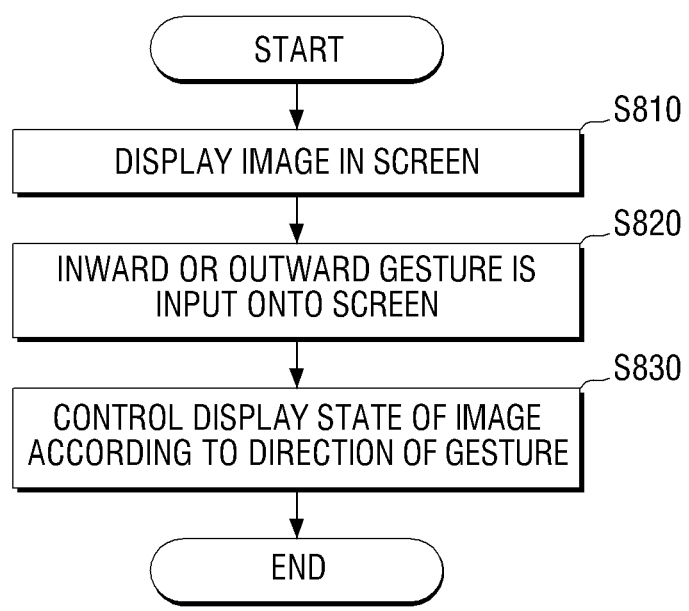
FIG. 8 is a flowchart of the display method according to an exemplary embodiment of the invention.

Hereafter, a display method according to an exemplary embodiment is described by referring to FIG. 8.

The method displays the image in the screen (S810).

Herein, the image can be various images such as web browser image, photo browser image, and PDF browser image. The image is not limited to those images, and can include other images.

The screen displaying the image can be driven by the touch screen or the mouse.

Next, the inward or outward motion is input onto the screen (S820).

In this exemplary embodiment, the motion can be the inward or outward screw-like motion.

For example, for the inward motion, the first circular motion of a certain size is input first and the second circular motion is input inside the first circular motion in succession. For the outward motion, the first circular motion of a certain size is input first and the second circular motion is input outside the first circular motion in succession. The inward motion can be the screw-like motion input helically toward the center of the motion, and the outward motion can be the screw-like motion input helically away from the center of the motion.

Alternatively, the inward or outward motion can be a plurality of separate circular motions input in sequence within a certain time.

For example, the inward motion can be made with the first circular motion of a certain size and thereafter the remaining circular motions of the plurality of circular motions can be made in sequence based on a decreasing size of the motions. The outward motion can be made with the first circular motion of a certain size and thereafter the remaining circular motions of the plurality of the circular motions are made in sequence based on increasing size of the motions.

Lastly, the method controls the display state of the image according to the motion direction (S830).

In this exemplary embodiment, the controlling step of the display state (S830) can zoom out for the inward motion and zoom in for the outward motion.

Alternatively, the controlling step of the display state (S830) can zoom in for the inward motion and zoom out for the outward motion.

Herein, the controlling step of the display state (S830) can reduce or enlarge the image according to the relative size difference between the first input circular motion and the next circular motion following in succession.

That is, the display method according to an exemplary embodiment executes the zoom-in or zoom-out function according to the inward or outward motion direction relative to a center of the motion, rather than the rolling direction of the motion. Thus, the user can easily perform the zoom-in or zoom-out function without having to remember the rolling direction of the motion.

Alternatively, when the motion proceeds inward, the controlling step of the display state (S830) can decrease at least one of the brightness, the contrast, and the resolution of the image. When the motion proceeds outward, the controlling step of the display state (S830) can increase at least one of the brightness, the contrast, and the resolution of the image.

That is, the display method in an exemplary embodiment can not only zoom in or zoom out, but also control the display state of the image such as brightness, contrast, and resolution of the image, according to the inward or outward motion.

In an exemplary embodiment, when the motion is input for a preset length, the controlling step of the display state (S830) can include displaying the first expected inward motion course and the second expected outward motion course.

In an exemplary embodiment, when the inward or outward motion stops and alters its direction, the controlling step of the display state (S830) can control the display state of the image to switch from the zoom-in function to the zoom-out function or from the zoom-out function to the zoom-in function.

For example, once the inward motion proceeds counterclockwise, when the direction of the motion alters to the clockwise direction, the zoom direction can be switched from the zoom-out function to the zoom-in function. When the outward motion proceeds counterclockwise and alters its direction clockwise, the zoom direction can be switched from the zoom-in function to the zoom-out function.

Hence, when the inward or outward motion input is recognized as one of the zoom-in function and the zoom-out function, the first motion progress stops, and the reverse motion is input, the display method according to an exemplary embodiment can control the display state of the image to switch to the other of the zoom-in function and the zoom-out function.

When recognizing the inward or outward motion input, the display method according to an exemplary embodiment can recognize the continuous input of the motion until recognizing the discontinuance of the motion input, for example, until the user's finger is detached from, i.e., not touching, the touch screen.

As set forth above, the display state of the image is controlled according to merely the direction of the motion relative to the center of the motion, rather than using a particular button or the widget or inputting the motion of a certain length. Therefore, the motion can be input without the limitation on the screen size.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A display apparatus comprising:
a display configured to display an image;
a touch screen configured to receive a motion comprising an approximate center, the motion moving in a direction that is one of inwardly toward and outwardly from the approximate center; and
a control unit configured to regulate a display state of the image on the display based on the direction of the motion that is input to the touch screen,
wherein the motion comprises a plurality of distinct, separate, concentric, circle motions input in succession within a certain time, and
wherein the control unit recognizes the motion as moving in the direction that is outward when a diameter of two successive circle motions of the plurality of separate circle motions increases, and recognizes the motion as moving in the direction that is inward when the diameter of two successive circle motions of the plurality of separate circle motions decreases,
wherein the control unit zooms in when the motion moves in the direction that is inward, and zooms out when the motion moves in the direction that is outward.

* * * * *